Aug. 30, 1938.   S. SIMS   2,128,856
CAKE KNOCKER FOR OIL PRESSES
Filed Dec. 12, 1936   2 Sheets-Sheet 1
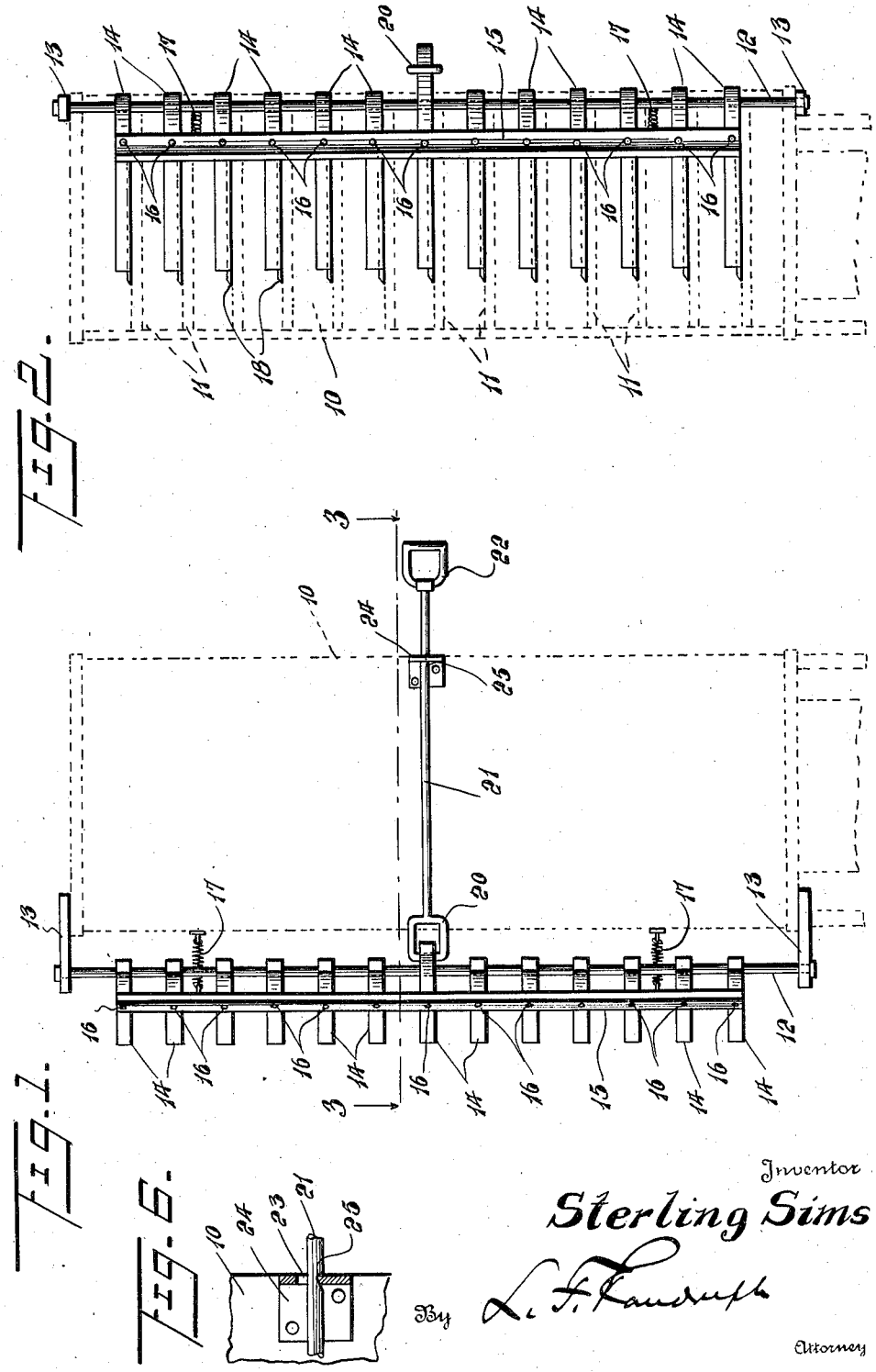
Inventor
Sterling Sims Aug. 30, 1938.  S. SIMS  2,128,856
CAKE KNOCKER FOR OIL PRESSES
Filed Dec. 12, 1936  2 Sheets-Sheet 2
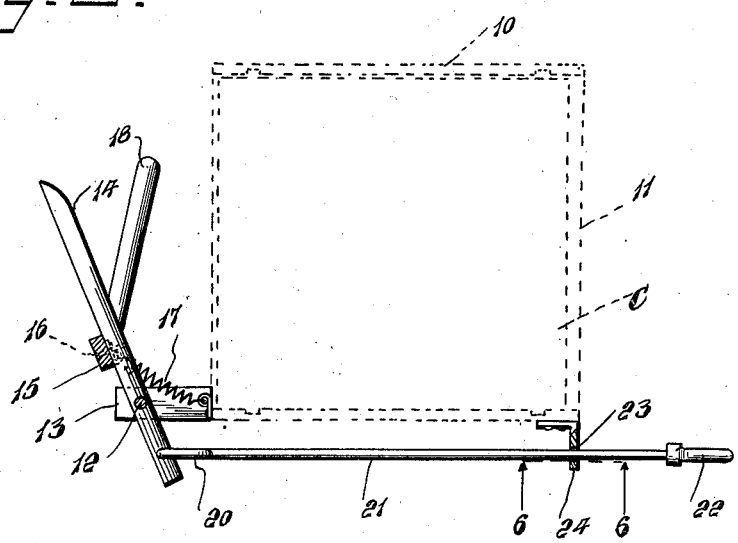
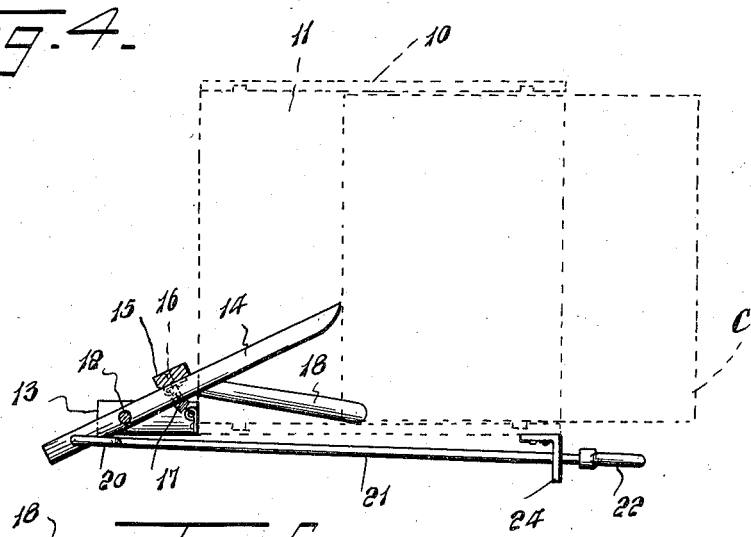
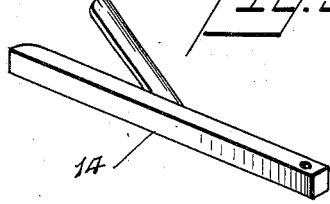
Inventor
Sterling Sims Patented Aug. 30, 1938

2,128,856

UNITED STATES PATENT OFFICE 2,128,856

CAKE KNOCKER FOR OIL PRESSES

Sterling Sims, Taylor, Tex.

Application December 12, 1936, Serial No. 115,591

2 Claims. (Cl. 100—50)

This invention relates to a knocker to be used for removing cakes of residue from an oil press or the like after expression of the oil therefrom and it is designed to provide a novel means whereby all of the pressed cakes may be removed from the press at the same time, and thus more expeditiously and efficiently than is true of the present hand method of individually removing them.

It is further aimed to provide a novel structure wherein a blade is used to penetrate between the cake and its support, to enable more ready removal of the cake, especially if there is a tendency for the same to stick.

The more specific objects and advantages will become apparent from a consideration of the description following taken in connection with accompanying drawings illustrating an operative embodiment.

In said drawings:—

Figure 1 is a view of the apparatus in side elevation, partly broken away to disclose details;

Figure 2 is an elevation taken at a right angle to Figure 1;

Figure 3 is a horizontal sectional view taken on the line 3—3 of Figure 1;

Figure 4 is a horizontal sectional view similar to Figure 3 but showing the parts in cake-removing position;

Figure 5 is a detail perspective view of one of the knockers, and severing blade; and Figure 6 is a detail section taken on the line 6—6 of Figure 3.

Referring specifically to the drawings, the oil press or mill includes a cabinet at 10 having a multiplicity of supports at 11 for the oil-bearing cakes from which the oil is to be extracted by pressure. After the oil is pressed out of the cakes they are individually and manually removed by present methods. According to the present invention, all of the cakes may be simultaneously removed after extraction of the oil through the mechanism constituting the present invention.

To the end mentioned, a vertical shaft or rod 12 in offset relation to the cabinet, is journaled in bearing arms 13, ball bearings being used if desired between such bearing arms and the shaft. Rigid on the shaft, are cake knocker bars 14 one for each cake, and arranged for movement across the upper surface of each of the supports. All of the knocker bars are connected together by a strip 15, parallel with shaft 12, and fastenings 16. The knocker bars are normally maintained retracted in the position of Figure 3, by expansive springs 17 connected to the cabinet and to the strip 15. Each knocker bar 14 has a knife or blade 18 rigidly attached thereto and extending therefrom at an angle, in position to move on top of the adjacent support 11, to sever any adhering cake of material therefrom, in advance of the engagement of the knocker bar with the cake, in the process of removing or ejecting the cake.

One of the knocker bars 14 has an opening in which a loop 20 of an operating rod is pivoted. Said rod has a handle at 22, and the rod passes slidably through an opening 23 in a bracket 24 fastened to the cabinet. The rod 21 also has a notch at 25 adapted for engagement with the adjacent edge portion of bracket 24 at the opening 23, to hold the knocker bars and associated parts retracted in the position of Figure 3, normally.

When it is desired to eject or remove the cakes from the support 11, the operating rod 21 is elevated to disengage the notch 25 from bracket 24 and is thereupon pushed away from the operator, first moving the knives 18 between the cakes of material and the support 11, following which, the free ends of the knocker bars 14 engage the cakes, displacing or ejecting them to the position shown in dotted lines in Figure 4, where the cake is designated C and from which position it may be readily removed. Following such forward pushing of the bar 21, it is released and the springs 17, which have been compressed by the ejecting movement, will restore the parts to the normal position of Figure 3, with the notch 25 automatically engaging the bracket 24, as shown in Figure 6, through such movement. The operating member 21 and the knocker bars are thus held against accidental movement from their normal or retracted position.

Various changes may be resorted to provided they fall within the spirit and scope of the invention.

I claim as my invention:—

1. An attachment for apparatus having supports for oil-bearing cakes, the cakes being accessible through a wall of the apparatus; the attachment being mounted exteriorly of the apparatus and normally retracted entirely exteriorly of the apparatus, said attachment comprising knocker bars, and a shaft journaled exteriorly of the apparatus adjacent one corner thereof and carrying said knocker bars at an angle in diverging relation to said wall, said knocker bars being operable through said wall, one to eject each cake after extraction of the oil therefrom, each knocker bar having a blade extending diagonally therefrom toward said wall and at an angle to the latter for cleaving engagement between a cake and its support to avoid hindrance to operation by sticking of the cake.

2. An attachment for apparatus having supports for oil-bearing cakes, the cakes being accessible through a wall of the apparatus; the attachment being mounted exteriorly of the apparatus and normally retracted entirely exteriorly of the apparatus, said attachment comprising knocker bars, a shaft journaled exteriorly of the apparatus adjacent one corner thereof and carrying said knocker bars at an angle in diverging relation to said wall, said knocker bars being operable through said wall, one to eject each cake after extraction of the oil therefrom, each knocker bar having a blade extending diagonally therefrom toward said wall and at an angle to the latter for cleaving engagement between a cake and its support to avoid hindrance to operation by sticking of the cake, one of the knocker bars being extended, an operating rod connected to the extended portion of the last mentioned knocker bar, spring means urging the knocker bars to retracted position, and latch means associated with the rod.

STERLING SIMS.